US010260566B2

(12) United States Patent
Salerno

(10) Patent No.: US 10,260,566 B2
(45) Date of Patent: Apr. 16, 2019

(54) MARINE ANTENNA ACTUATOR

(71) Applicant: Mark H. Salerno, Stratford, CT (US)

(72) Inventor: Mark H. Salerno, Stratford, CT (US)

( * ) Notice: Subject to any disclaimer, the term of this patent is extended or adjusted under 35 U.S.C. 154(b) by 437 days.

(21) Appl. No.: 15/150,913

(22) Filed: May 10, 2016

(65) Prior Publication Data
US 2016/0333992 A1     Nov. 17, 2016

Related U.S. Application Data

(60) Provisional application No. 62/160,835, filed on May 13, 2015.

(51) Int. Cl.
| F16H 57/029 | (2012.01) |
| F16C 41/00 | (2006.01) |
| F16H 57/039 | (2012.01) |
| F16H 57/021 | (2012.01) |
| F16H 57/02 | (2012.01) |

(52) U.S. Cl.
CPC ......... *F16C 41/004* (2013.01); *F16H 57/021* (2013.01); *F16H 57/029* (2013.01); *F16H 57/039* (2013.01); *F16H 2057/0213* (2013.01); *F16H 2057/02082* (2013.01)

(58) Field of Classification Search
CPC .... F16C 41/004; F16H 57/021; F16H 57/029; F16H 57/039
See application file for complete search history.

(56) References Cited

U.S. PATENT DOCUMENTS

| 4,055,845 A | 10/1977 | Ladrick |
| 4,323,902 A | 4/1982 | Hussey et al. |
| 4,527,168 A | 7/1985 | Edwards |
| 4,841,309 A | 6/1989 | Burr |
| 5,146,799 A | 9/1992 | Sato et al. |
| 5,245,351 A * | 9/1993 | Chou ................. H01Q 3/04 343/763 |
| 5,473,335 A * | 12/1995 | Tines ................. H01Q 3/04 248/652 |
| 5,560,256 A * | 10/1996 | Tines ................. H01Q 3/04 248/284.1 |

(Continued)

FOREIGN PATENT DOCUMENTS

FR     2926928 A1 *   7/2009       H01Q 1/125

OTHER PUBLICATIONS

Walcott Radio.com, Diamond Antenna K9000LRMO Motorized Oversize Luggage Rack Mount for UHF/SO239 Antennnas, [retrieved from the Internet] <http://www.walcottradio.com/diamond-antenna-k9000lrmo-motorized-oversize-luggage-rack-mount-for-uhfso239-antennnas-p-2886.html>, dated Feb. 3, 2016, 3 pages.

*Primary Examiner* — David M Fenstermacher

(74) *Attorney, Agent, or Firm* — Lipsitz & McAllister, LLC

(57) ABSTRACT

An actuator for a marine antenna having a base with a mount adapted to be fixed to a surface of a vessel, a fixed worm gear arranged on the base, a worm arranged in a gear housing and engaged with the fixed worm gear, a motor comprising an output shaft connected to the worm, the motor being arranged in a motor housing mounted to the gear housing, and an antenna coupler connected to the gear housing. The gear housing is adapted to mate with the base for rotation about the fixed worm gear upon rotation of the worm.

19 Claims, 19 Drawing Sheets

(56) References Cited

U.S. PATENT DOCUMENTS

| | | | | |
|---|---|---|---|---|
| 5,888,246 | A * | 3/1999 | Gow | F16H 57/021 |
| | | | | 74/425 |
| 6,361,570 | B1 | 3/2002 | Gow | |
| 8,808,397 | B2 | 8/2014 | Gow | |
| 2004/0099076 | A1* | 5/2004 | Haskin | F16H 37/041 |
| | | | | 74/425 |
| 2005/0050976 | A1* | 3/2005 | Ko | E05F 11/505 |
| | | | | 74/425 |
| 2008/0223164 | A1* | 9/2008 | Greulich | F16H 57/021 |
| | | | | 74/425 |
| 2009/0000120 | A1* | 1/2009 | Shiino | B23F 11/00 |
| | | | | 29/893.31 |
| 2009/0071279 | A1* | 3/2009 | Huck | E05F 15/689 |
| | | | | 74/425 |
| 2009/0095106 | A1* | 4/2009 | Hollender | F24F 13/1426 |
| | | | | 74/425 |
| 2010/0224020 | A1* | 9/2010 | Haussecker | F16H 55/17 |
| | | | | 74/425 |
| 2014/0373658 | A1* | 12/2014 | Tamaki | F16H 57/039 |
| | | | | 74/425 |
| 2016/0268669 | A1* | 9/2016 | Wilcox | H01Q 1/125 |

* cited by examiner

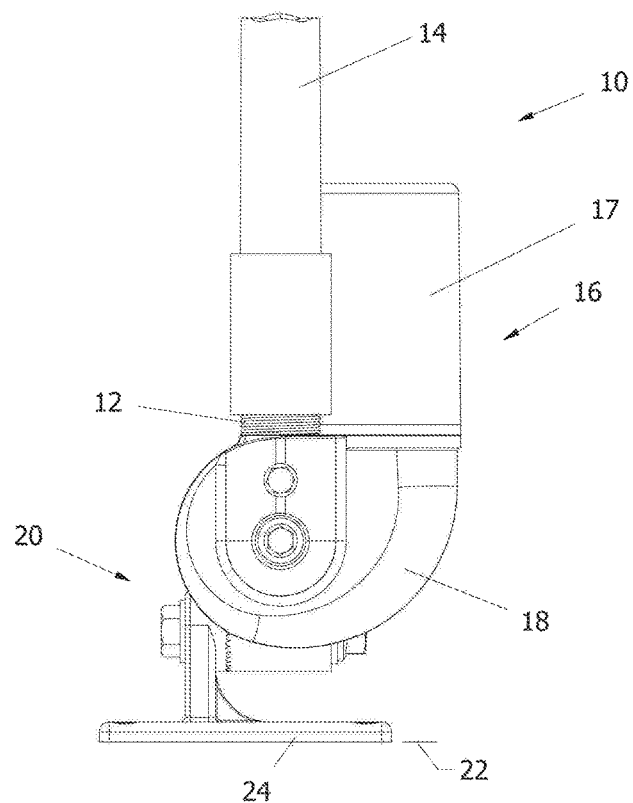
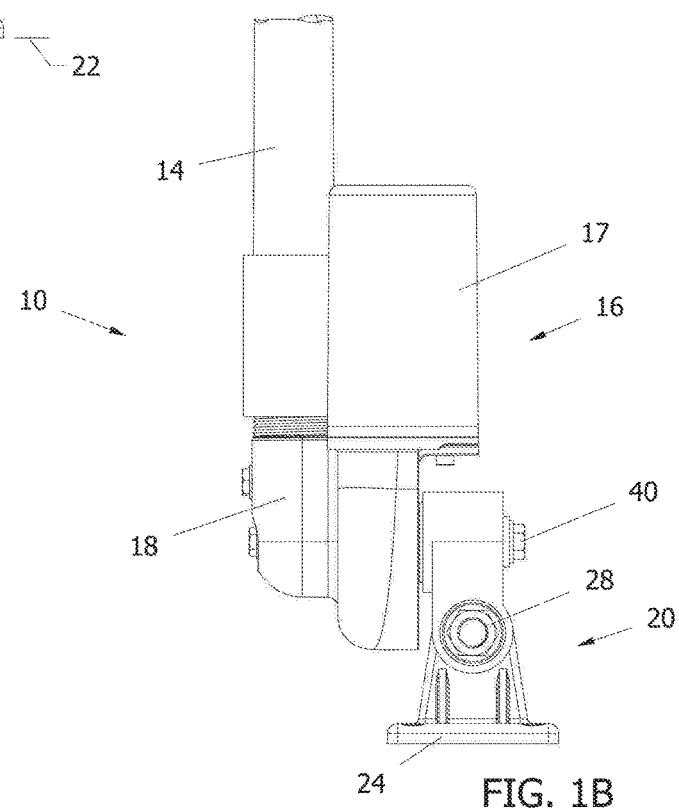

MARINE ANTENNA ACTUATOR

This application claims the benefit of U.S. provisional patent application No. 62/160,835 filed on May 13, 2015, which is incorporated herein and made a part hereof by reference.

BACKGROUND OF THE INVENTION

The present invention relates to the field of actuators for raising and lowering antennas or other devices. More specifically, the present invention provides an actuator for antennas used on marine vessels in a marine environment.

VHF, radar, GPS and other types of antennas and other marine devices are commonly mounted on boat tops, cabin sides, and arches out of reach of most people. It is necessary to lower and re-raise these devices when passing under some bridges crossing waterways and under highways when trailering. In many cases this requires an operator to climb onto the top of the boat or stand on a gunwale. It is common for boats to have multiple antennas. Raising and lowering these devices can be time consuming and dangerous. An operator without passengers aboard must leave the helm to perform this task. A mistake could result in a fall overboard or injury. On trailered boats this often takes place after the boat has been hauled from the water in which case the gunwale may be 6' or higher off the ground.

It would be advantageous to provide a remotely activated motorized actuator designed specifically for use in a marine environment which overcomes the foregoing dangers and inconveniences.

The apparatus and corresponding methods of the present invention provide the foregoing and other advantages.

SUMMARY OF THE INVENTION

The present invention relates to an actuator for antennas used on marine vessels in a marine environment. It should be appreciated that the actuator of the present invention may also be used for other applications, as will be apparent from the explanations set forth below.

In one example embodiment of an actuator for a marine antenna, the actuator may comprise a base with a mount adapted to be fixed to a surface of a vessel, a fixed worm gear arranged on the base, a worm arranged in a gear housing and engaged with the fixed worm gear, a motor comprising an output shaft connected to the worm, the motor being arranged in a motor housing mounted to the gear housing, and an antenna coupler connected to the gear housing. The gear housing is adapted to mate with the base for rotation about the fixed worm gear upon rotation of the worm.

The fixed worm gear may be arranged on a worm gear shaft with a zero tolerance fit. In such an embodiment the worm gear shaft has no rotational component. A portion of the worm gear shaft may extend through the gear housing. The gear housing may rotate on the portion of the worm gear shaft which extends through the gear housing. One or more ultra-high molecular weight polyurethane (UHMWPE) bearings may be provided on the portion of the worm gear shaft which extends through the gear housing.

A water-tight seal may be provided between the gear housing and the worm gear shaft at a point of entrance of the worm gear shaft into the gear housing. The motor housing and the gear housing may each comprise water-tight housings.

The actuator may further comprise a drive limiter for limiting a maximum angular displacement of the gear housing about the worm gear. The drive limiter may be adjustable to permit changing of the maximum angular displacement.

In one example embodiment, the drive limiter may comprise one or more limiting elements fixed within the gear housing. The one or more limiting elements may extend within a curved slot of the worm gear. A contour of the curved slot may correspond to an outer envelope of the worm gear. An extent of the rotation of the gear housing about the worm gear may be limited in each direction of movement by the one or more limiting elements contacting a corresponding end of the curved slot. A position of the one or more limiting elements may be adjustable.

The actuator may further comprise a motor controller for sensing a current spike when the one or more limiting elements contacts the corresponding end of the curved slot and for turning off the motor when the current spike is sensed.

In a further example embodiment, the drive limiter may comprise magnetic position indicators arranged on one of the worm gear or a magnet housing fixed in relation to the worm gear and one or more corresponding sensors arranged on an electronic circuit board. The magnetic position indicators may comprise two spaced apart magnetic position indicators arranged on the worm gear or the magnet housing. A position of each of the two magnetic position indicators may be adjustable.

Optionally, the magnetic position indicators may comprise a plurality of magnetic position indicators arranged on the worm gear or on the magnet housing. The electronic circuit board is programmable to turn off current to the motor upon sensing any one of the plurality of magnetic position indicators.

The motor may be controlled remotely via at least one of a remotely wired switch and a wireless remote control device in communication with one of the electronic circuit board or a motor controller in communication with the electronic circuit board. At least one of the remotely wired switch or the wireless remote control device may be adapted to control two or more actuators simultaneously with a single command. The two or more actuators may be set to operate within angular ranges which are independent of one another.

The antenna coupler may be removably connected to the gear housing.

The motor, the output shaft, and the worm may form a drive arrangement with an axis that extends parallel to an axis of the antenna coupler.

The motor may be controlled remotely via at least one of a remotely wired switch and a wireless remote control device in communication with a motor controller. The motor may be operated in at least one of a latched mode or a momentary mode. The gear housing may be rotatable between two stop positions. In the latched mode, the motor once initiated will run until the gear housing reaches one of the two stop positions. In the momentary mode, the gear housing is rotatable to either of the two stop positions and any position between the two stop positions.

In a further example embodiment, the actuator may further comprise a torque limiting device arranged between the output shaft and the worm.

The worm may be radially fitted to the output shaft and axially constrained by walls of the gear housing, preventing axial loads from being transferred to the motor.

Methods of manufacturing an actuator as described above are also encompassed by the present invention and will be apparent from the detailed description provided below.

BRIEF DESCRIPTION OF THE DRAWINGS

The present invention will hereinafter be described in conjunction with the appended drawing figures, wherein like reference numerals denote like elements, and:

FIGS. 1A-1I show an example embodiment of the present invention from various angles in both the lowered and raised positions;

Figure 1C:
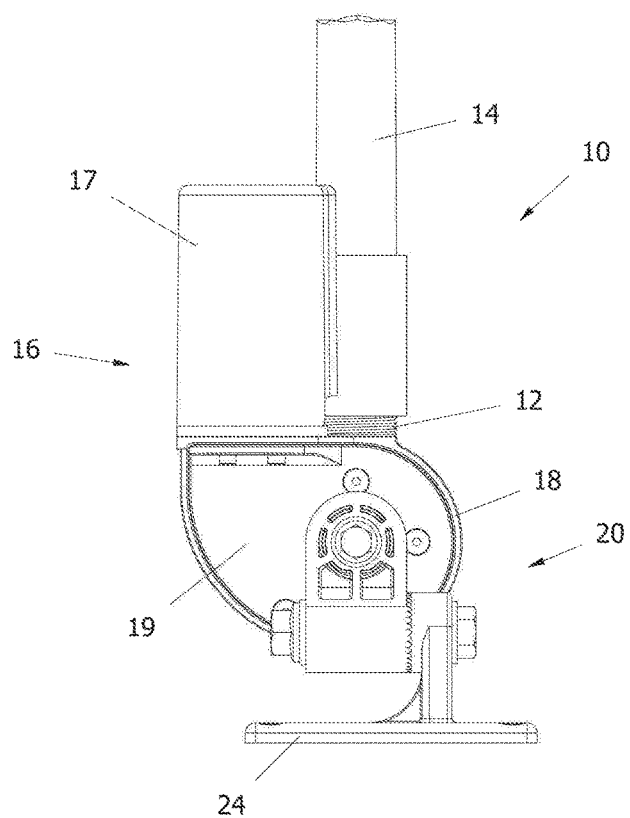
Figure 1D:
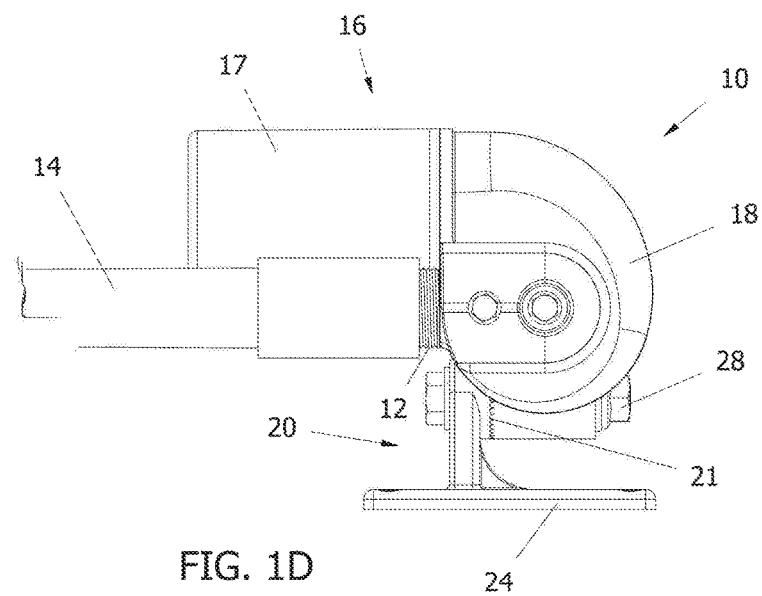
Figure 1E:
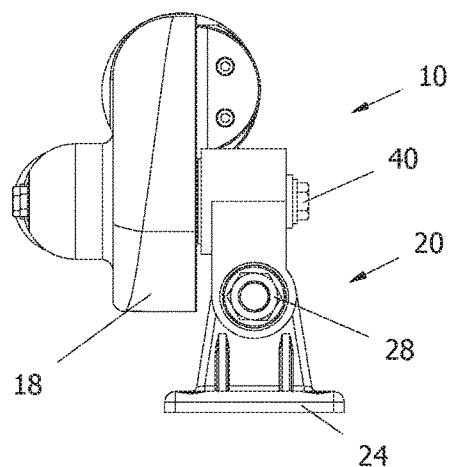
Figure 1F:
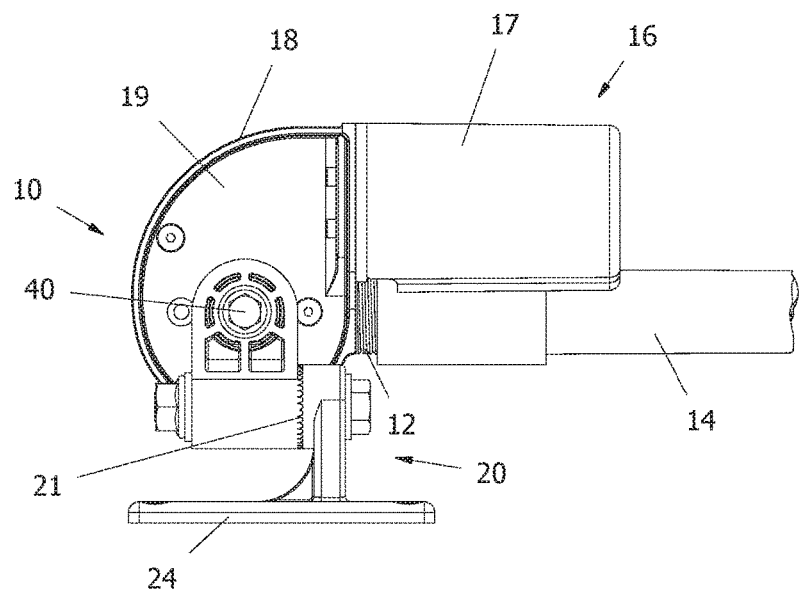
Figure 1I:
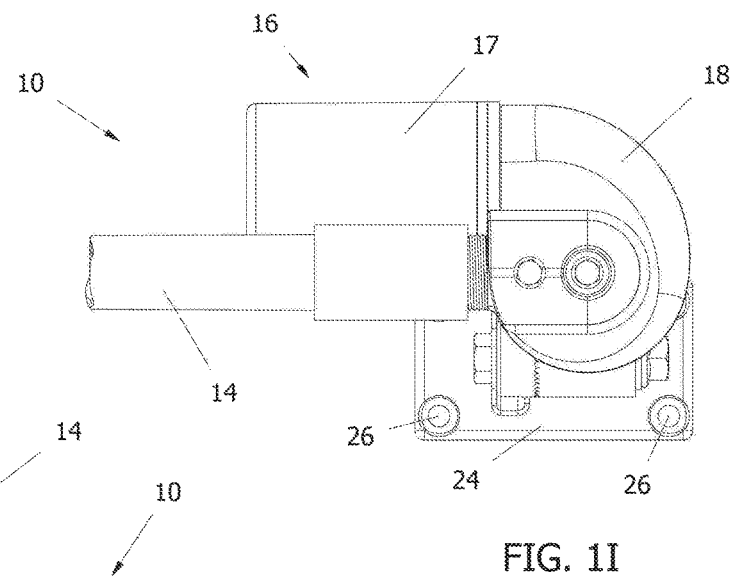
Figure 1G:
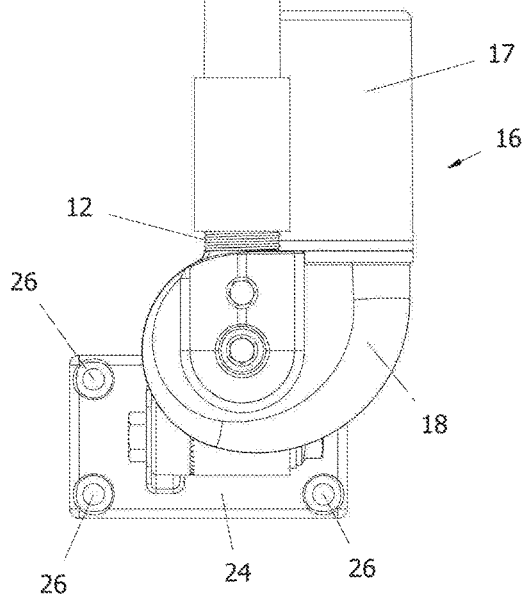

It should be appreciated that, for the sake of clarity and ease of explanation, various components of the actuator are omitted from certain of the drawing figures, as will be apparent from the drawing figures as a whole.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention provides a remotely activated antenna actuator which automatically positions an antenna in a desired position which is specifically designed for use in a marine environment.

FIGS. 1A-1I show various views of an example embodiment of the antenna actuator 10 of the present invention from various angles in both the fully raised and fully lowered positions. As can be seen from FIGS. 1A-1I, an antenna mount 12 (also referred to herein as a device mount or coupler), antenna 14, motor 16 within a motor housing 17, and gear housing 18 all rotate about a fixed base 20 as part of a drive assembly. The drive assembly, which contains the motor 16, antenna mount 12, and gear housing 18, is arranged on one side of a mounting plane 22 (e.g., offset to one side of the fixed base 20). The motor 16 may be arranged coaxial with the antenna mount 12 for a compact design.

Figure 1H:
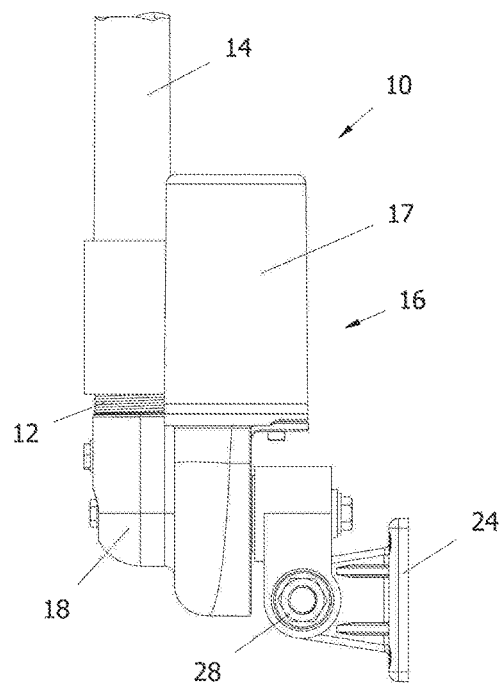

A base portion 24 (e.g., a mounting plate or mounting surface) of the base 20 may be pre-drilled with holes 26 for mounting to a mounting location on a vessel. The pattern or arrangement of the holes 26 may conform to that of a standard hole pattern for VHF or other antenna mounts. The base portion 24 can be mounted to any flat surface, regardless of the angle of that surface, and the base 20 can be rotated to a desired position with respect to base portion 24 once the base portion 24 is secured to the flat surface. An adjusting nut 28 may be provided for securing the base 20 in a desired position with respect to the base portion 24 (e.g., corresponding to intervals defined by the interlocking teeth 21 of the base unit 20 (see, e.g., FIG. 3A). For example, FIG. 1B shows the base portion 24 adjusted for mounting on a horizontal surface, and FIG. 1H shows the base portion 24 adjusted for mounting on a vertical surface.

In addition, a compressible mounting pad or gasket may be provided for placement between the vessel mounting surface and the base portion 24. Such a compressible mounting pad may protect the vessel mounting surface, aid in providing a water-tight seal preventing water from entering into any mounting holes drilled in the vessel, reduce noise transfer from the exterior to the interior of the vessel, and provide the ability to mount the base portion to an irregular or slightly curved surface. Wedge shaped mounting pads of various angles may be provided for mounting the base unit to different angled flat surfaces.

FIGS. 2A-2E show various views of the drive components. The motor 16 may comprise a 12-volt DC motor with a 100:1 gear reduction ratio. Other ratios may be provided for different applications (e.g., to provide different speeds and/or to accommodate different antenna sizes, weights, and loads).

Figure 2A:
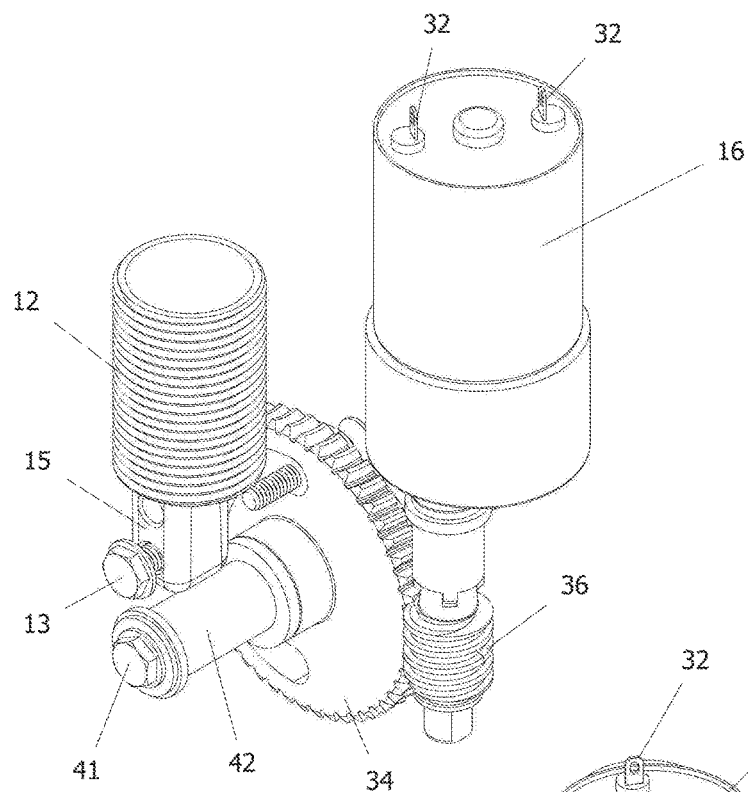
FIGS. 2A-2E show various assembled, cutaway and partial views of an example embodiment of the drive components of the present invention without housings and covers.
Figure 2B:
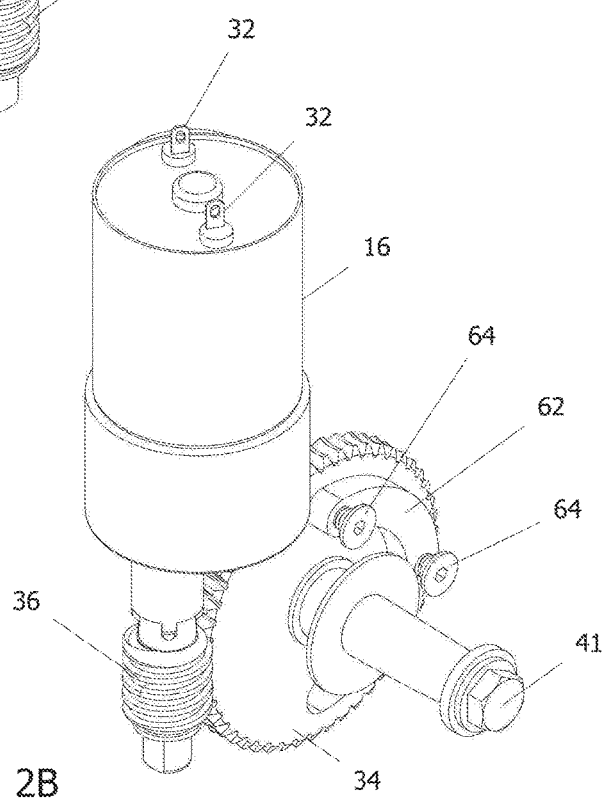
Figure 2C:
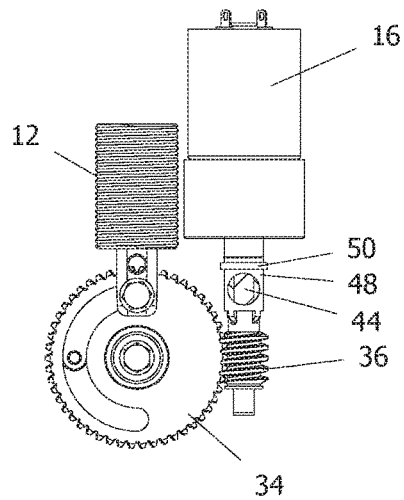
Figure 2E:
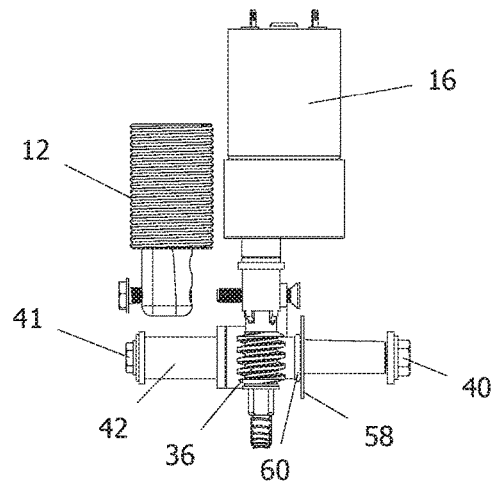
Figure 6A:
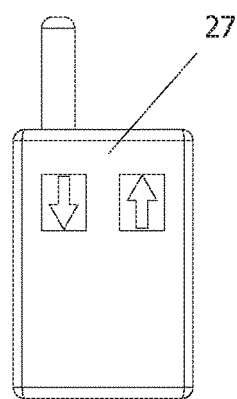
FIGS. 6A and 6B show example embodiments of a remote control transmitter and a motor controller/receiver, respectively, in accordance with the present invention.
Figure 6B:
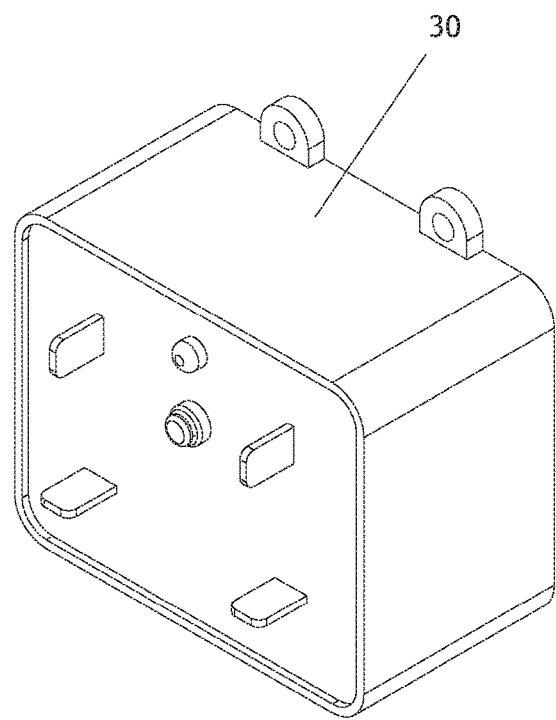

The actuator may be triggered automatically when the main batteries to the vessel are turned off, and/or may be operated remotely. The motor 16 may be hardwired to a voltage source and controlled via a remote control device or a hardwired switch. FIG. 6A shows an example embodiment of a remote control actuator 27 (e.g., a fob or the like) and FIG. 6B shows an example embodiment of a motor controller/receiver 30. The motor controller/receiver 30 may be an off the shelf controller that is designed or modified to limit current, which is adapted to plug into or be hardwired to the motor 16 (e.g., via contacts 32 located at the top of the motor 16 as shown in FIGS. 2A and 2B, or at connection points extending from the motor housing 17). In an embodiment where the motor controller/receiver 30 is hardwired to the motor 16, the controller/receiver 30 may be located remote from the motor 16, for example in a cabin of the vessel or underneath a console, in order to be protected from weather. Optionally the motor controller/receiver 30 may be weatherproof. As discussed above, the actuator/transmitter 27 may be implemented as a portable fob-type device. However, it should be appreciated that the transmitter may be configured as a switch (either wireless or hardwired) mounted in the console at the helm of the vessel (or other easily accessible location), and/or may be implemented as a smart phone application. The controller/receiver 30 may be adapted to receive Bluetooth signals, RF signals, infrared signals, or other wireless signals in a wireless environment. The controller/receiver 30 may also be Internet-enabled in embodiments where the vessel is equipped with a wireless network. The actuator 10 may work in latched mode where once initiated by the controller 30 it will run until it hits a hard stop or an adjustable stop flag is detected by a sensor as discussed below in connection with the drive limiter embodiments (e.g., until the actuator 10 is fully raised or fully lowered). Alternatively, or in addition to the latched mode, the actuator 10 may work in a momentary mode where it can be moved to any position between stops (e.g., the motor will run as long as the switch is held provided a hard stop or stop sensor is not reached).

As shown in FIGS. 2A-5C, the actuator drive comprises a worm drive with a fixed worm gear 34. One advantageous feature of the present invention is the absence of a rotating output shaft for the worm gear 34. As shown in FIG. 4B, in one example embodiment, the worm gear shaft 38 has a taper and flat on one end that mates to the base portion 20 with an interfering fit. The worm gear 34 is fixed to the worm gear shaft 38 and has no rotational component. For example, the shaft 38 may be pressed into the worm gear 34 with a zero tolerance fit. The worm gear shaft/gear assembly is drawn into the base 20 with a cap screw 40 during assembly. This provides a zero tolerance connection between the worm gear shaft 38 and base 20 once assembled. The drive assembly rotates about the worm gear 34 and has one degree of rotational freedom about the worm gear shaft 38. The worm gear shaft 38 is fitted with one or more Ultra High Molecular Weight Polyethylene (UHMWPE) flanged plain bearings 42 with an interference fit to the shaft 38. These bearings 42 advantageously eliminate tolerances in the assembly, provide thrust surfaces and sealed connections, require no maintenance, and prevent metal to metal contact where electrolysis could otherwise occur.

Figure 5A:
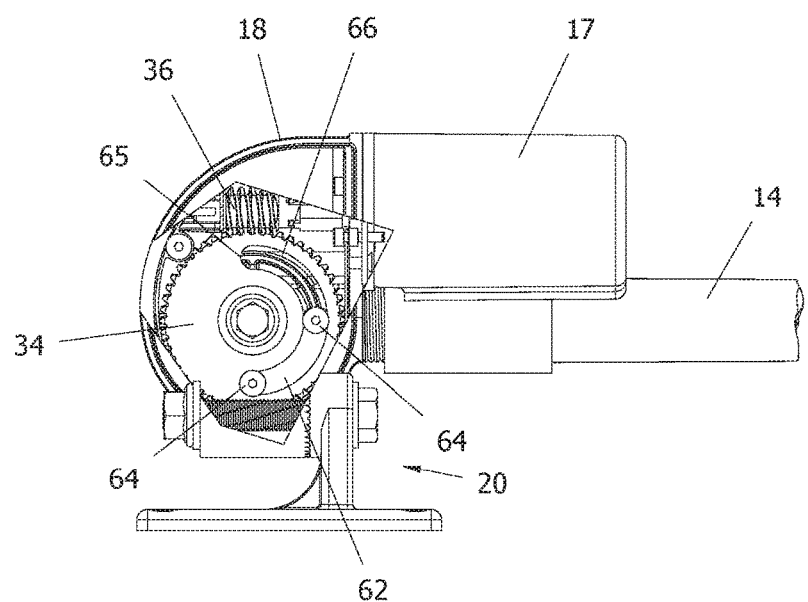
FIGS. 5A-5B show partial internal cutaway views of an example embodiment of the present invention with an example embodiment of a mechanical drive limiter in different orientations of the actuator.
Figure 5B:
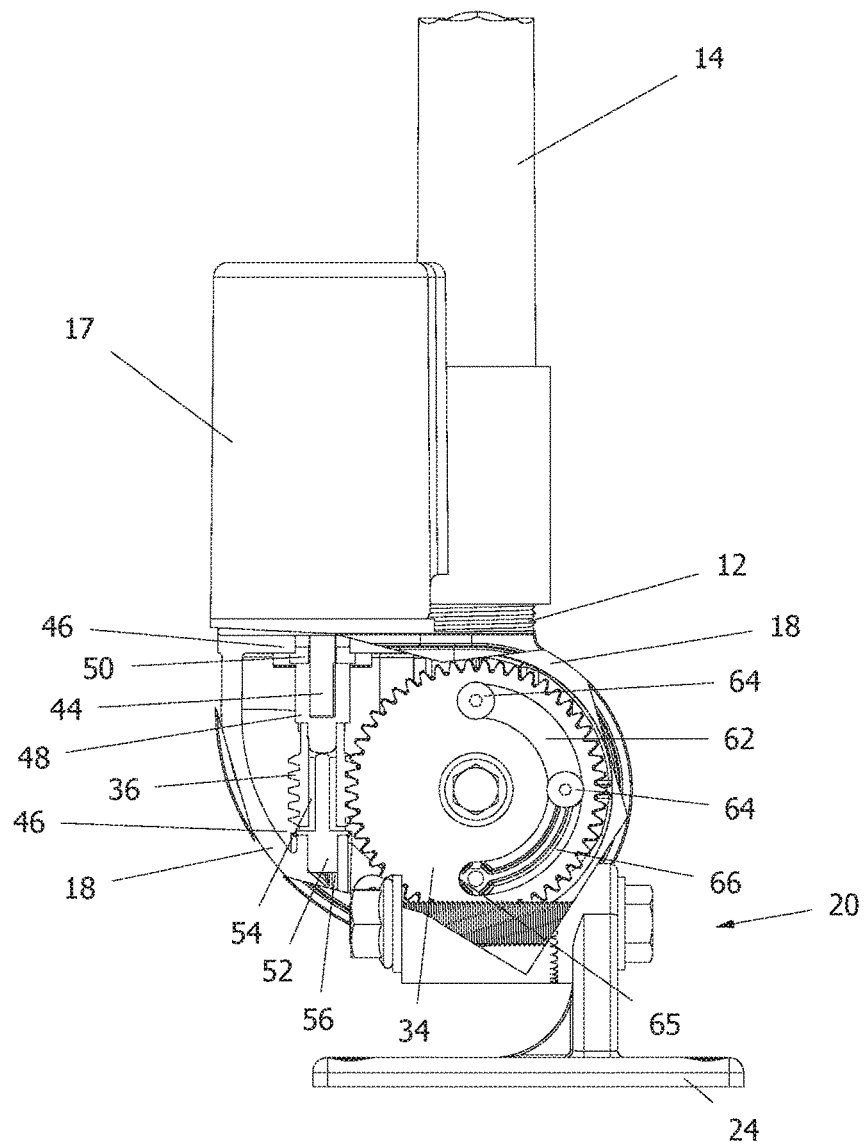

A worm 36 is connected to the gear motor 16 via a motor output shaft 44 (see, e.g., FIG. 5B). The use of a gear motor 16 coupled to a worm drive provides the high torque necessary to overcome friction in the assembly due to tight fitting interference connections and also enables positioning of the device with a smooth constant velocity motion. The worm also serves as a brake and position lock, as it is not possible to back drive a worm. In other words, the system may only rotate when a voltage is intentionally applied to the motor 16. The gear motor 16 may be mounted parallel to the device mount 12 and may rotate with the gear housing 18 and device mount 12 about the worm gear shaft 38. Further, the gear motor 16, the output shaft 44, and the worm 36 may form a drive arrangement with an axis that extends parallel to an axis of the device mount 12.

This configuration eliminates pinch points between the device and the motor 16, and provides a compact aesthetic package in which the device and motor wires can be bundled together in a single service loop. Driving the assembly to a hard stop also eliminates backlash in the gear train by loading the gears to one side.

The worm 36 may be fitted to the output shaft 44 radially and may be captured axially between walls 46 of the gear housing 18 such that it cannot apply axial loads to the motor 16 (see, e.g., FIG. 5B). These features are critical in the marine environment where cyclical loading due to wind and waves would quickly damage loosely mated drive components.

Figure 2D:
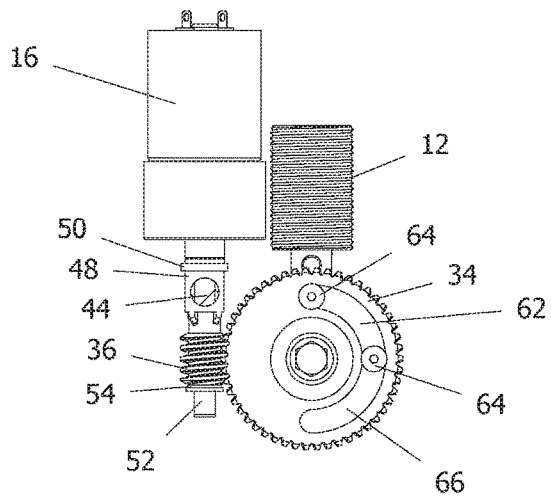

As shown in FIGS. 2D and 5B for example, the worm 36 for driving the assembly around the fixed worm gear 34 is connected to the motor output shaft 44 by a drive dog 48 (shown in cutaway views in FIGS. 2C and 2D), with a thrust washer 50 arranged between the drive dog 48 and the gear housing 18. The drive dog 48 is constrained radially to the motor shaft 44 by mating flats. However, the drive dog 48 is not constrained axially to prevent thrust loading to the motor 16. The drive dog 48 as shown in the Figures is a positive drive, without any slip.

Figure 8A:
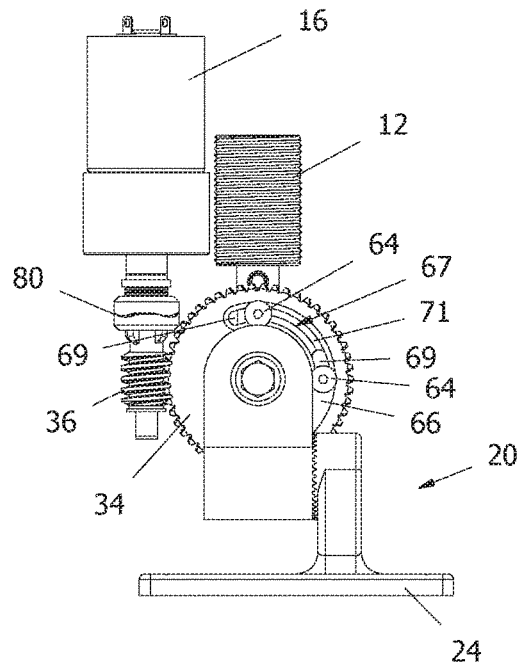
FIGS. 8A-8C show a further example embodiment of a mechanical drive limiter for use with an actuator in accordance with the present invention, without housings and covers.
Figure 9:
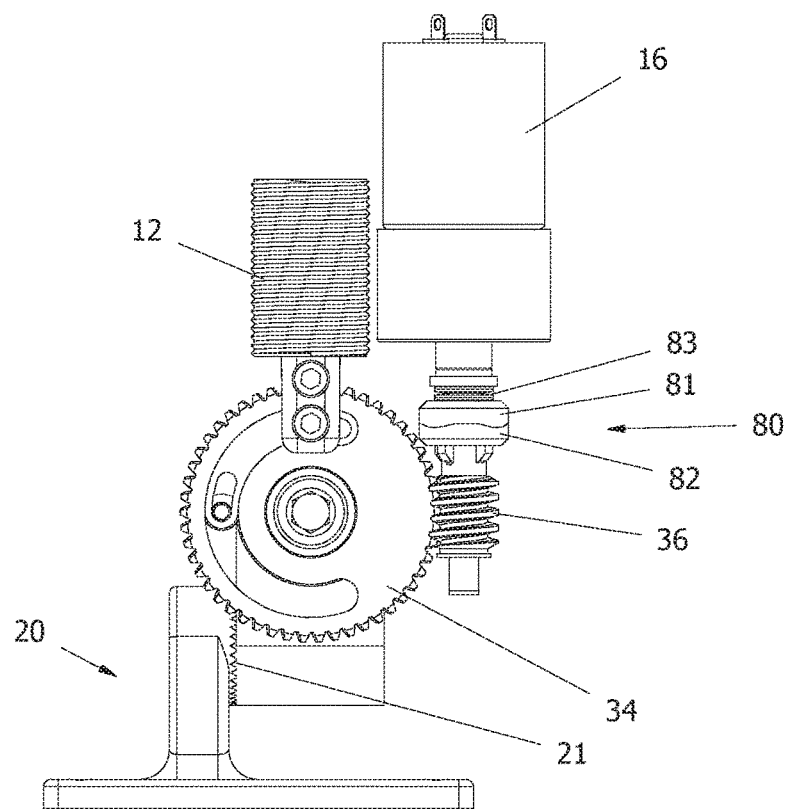
FIG. 9 shows an example embodiment of a torque limiting device for an actuator in accordance with the present invention, without housings and covers.

It should be appreciated that the drive dog 48 may instead be designed as a torque limiting device. Use of a suitable torque limiting device would transfer enough torque to raise and lower the antenna 14 while protecting the gear motor 16 from stresses induced by rapid deceleration due to hitting a hard stop. FIG. 9 shows an example embodiment of an actuator (without housings or covers) with a torque limiting device 80 in accordance with the present invention. In the example embodiment shown, the torque limiting device 80 may comprise two coupling components 81, 82 which positively engage with one another via corresponding wave-shaped interacting surfaces. The motor-side coupling component 81 may have a flat in the inner bore for positive engagement with the motor output shaft and have one degree of freedom in the axial direction of the motor output shaft against a spring force applied by a spring mechanism 83. The spring mechanism 83 may comprise one or more of wave springs, Belleville-type washers, or elastomeric springs. When the torque exceeds the designed torque limit, the respective wave faces of the coupling components 81, 82 will disengage and climb one another (as shown, e.g., in FIG. 8A), resulting in separation in the axial direction. FIG. 8A shows a separation of the wave-shaped surfaces after driving to a hard stop (e.g., using the current limit sensed by the controller 30 to turn off the motor), where the worm 36 and worm gear 34 are loaded to a zero backlash position without over stressing the gear train. Further continued actuation of the motor 16 would result in further separation of the wave-shaped surfaces, causes compression of the spring mechanism 83 and slipping of the torque limiting device, with no further torque or rotational movement imparted to the worm 36. A clicking sound resulting from the slipping of the wave-shaped surfaces over one another will indicate that the actuator has reached its travel limit and/or exceeded the torque limit (whether the device is actuated in latched mode or momentary mode). The torque limiting device 80 may be implemented with or without a movement timeout. The coupling components 81, 82 may be made of stainless steel in view of the low duty cycle of the device, or may be made of a combination of steel and bronze for superior wear characteristics. Plastics may also be used in combination with stainless steel.

Those skilled in the art will appreciate that many other configurations of a torque limiting device may be used between the output shaft 44 and worm 36, including but not limited to a friction-type clutch, spring-loaded friction surfaces, a ball-detent clutch, or a brake lining that slips at a known torque, or the like.

The worm 36 is not back driveable by the worm gear 34 so the motor 16 is never subjected to loads higher than it can apply. For example, a large wave or collision causing the boat to slow rapidly would result in an abrupt torque being applied to the antenna 14 and/or device coupler 12 due to the forward momentum of the antenna 14 being stopped. This drive arrangement isolates the motor 16 from the resulting forces which are absorbed by the more robust gear housing 18. This arrangement also advantageously allows the use of a more compact, lightweight, and low cost motor 16.

In one example embodiment as shown in FIGS. 2D and 5B, the worm 36 comprises a hollow shaft which is captured between the housing walls 46 using an alignment pin 52 with a thrust surface and an UHMWPE bearing 54 at the distal end of the worm. One end of the alignment pin 52 projects into the hollow shaft of the worm 36 and the other end of the alignment pin 52 fits into a corresponding preformed location 56 in the housing 18 and serves to align the worm 36 and motor output shaft 44 for engagement with the worm gear 34. The UHMWPE bearing 54 surrounds the alignment pin 52 at least in a portion that extends into the hollow shaft of the worm 36 and permits rotation of the worm 36 while providing an interference radial fit. The outer diameter of the UHMWPE bearing 54 is larger than the inner diameter of the hollow shaft of the worm 36, and the inner diameter of the UHMWPE bearing 54 is smaller than the outer diameter of the alignment pin 52 before installation. As the UHMWPE material permits cold flows, a zero tolerance fit after assembly is achieved. The UHMWPE bearing 54 moves relative to the pin 52 but does not move relative to the worm 36.

The device coupler/antenna mount 12 may comprise either internal or external threads adapted for various standard antenna connections. As shown in FIG. 2A, the device coupler 12 may be provided with a shaft 15 that is in turn connected to the housing 18 (e.g., via a bolt or screw 13). The device coupler 12 may be removable from the shaft 15 and interchangeable with other couplers of different sizes and thread configurations. Alternatively, the coupler 12 and shaft 15 may comprise an integral unit which can be interchanged with other units having different coupler sizes or thread configurations.

Figure 3A:
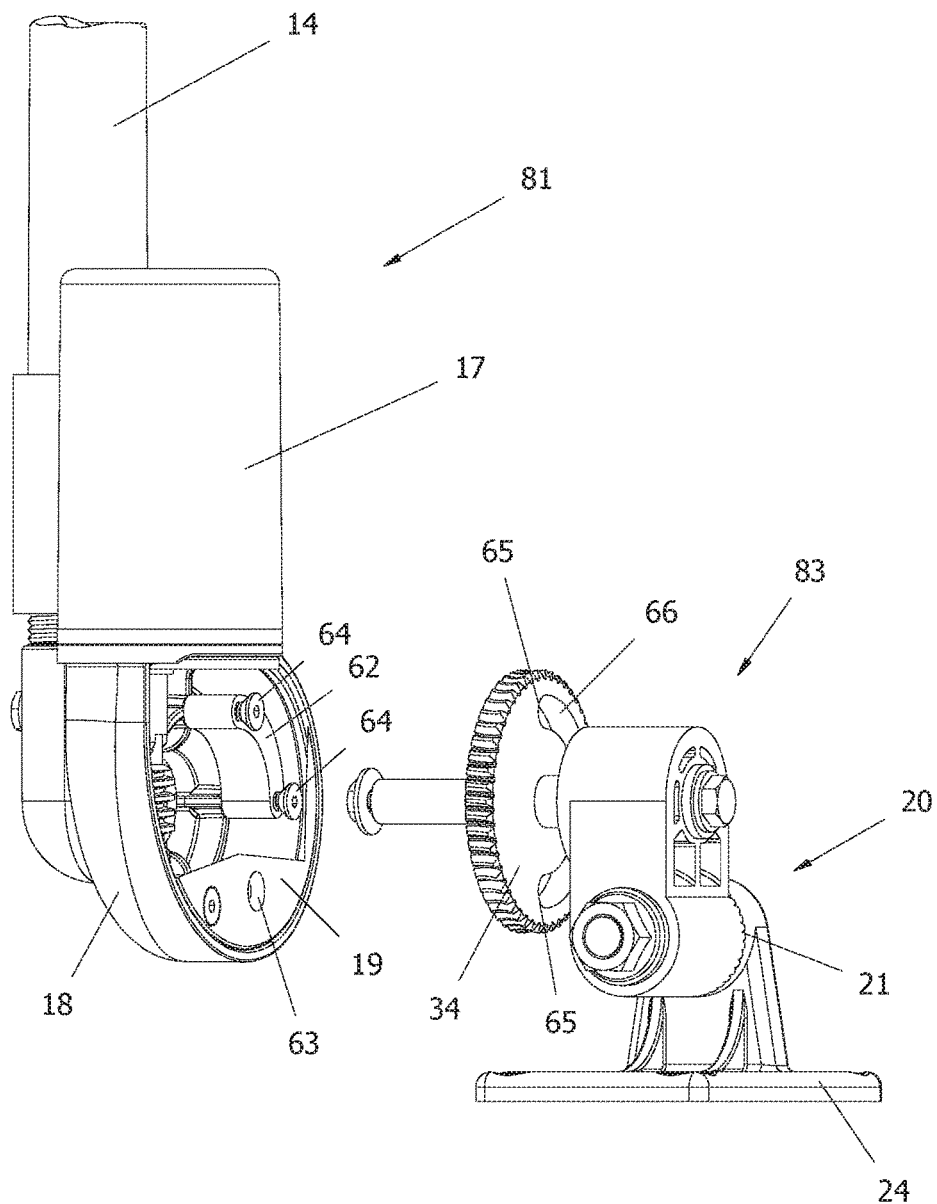
FIGS. 3A and 3B show an exploded and assembled view, respectively, with cutaways, of an example embodiment of the rotating assembly and fixed assembly in accordance with the present invention.
Figure 3B:
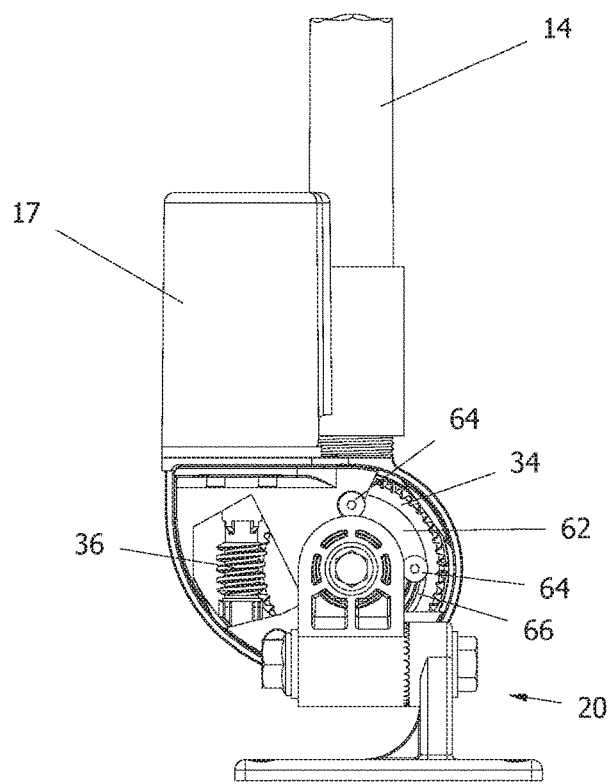
Figure 4A:
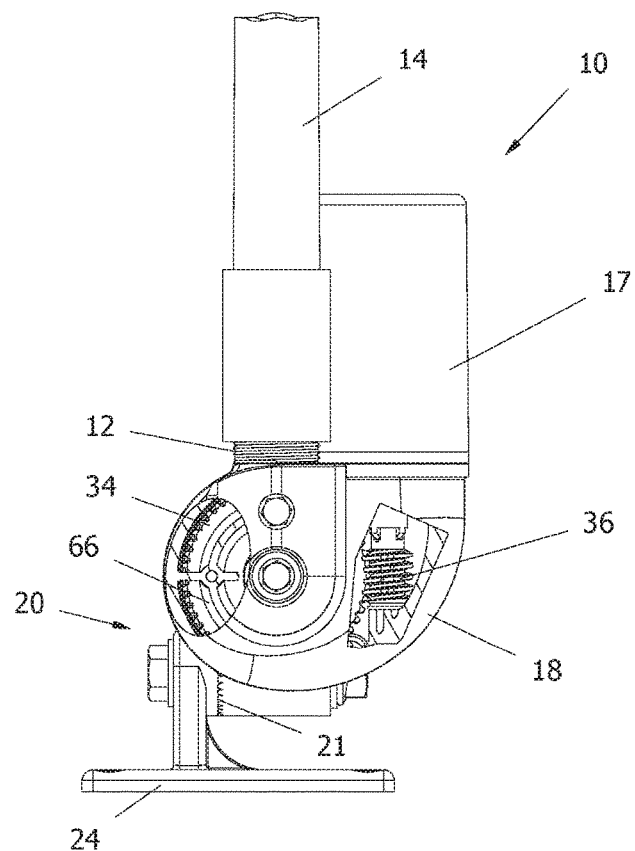
FIGS. 4A and 4B show an example embodiment of the present invention shown in cutaway and cross-sectional views, respectively.

FIG. 3A shows the rotating assembly 81 separated from the base assembly 83. The rotating assembly 81 (shown with cutaway in rear cover 19) may be comprised of the motor 16 and motor cover 17, the worm 36, the gear housing 18, a limiting element 62, the rear cover 19, the device coupler 12, and the antenna 14. The base assembly 83 may be comprised of the base 20, the base portion 24, the worm gear 34 and the worm gear shaft 38. The entire rotating assembly 81 rotates as a unit about the worm gear shaft of the base assembly 83 as a result of the motor 16 driving the worm 36, which rotates around the fixed worm gear 34. FIG. 3B shows the assembled state of the actuator with cutaway views showing the worm 36 and the drive limiter. FIG. 4A shows the actuator of FIG. 3B from the opposite side with corresponding cutaway views.

Figure 4B:
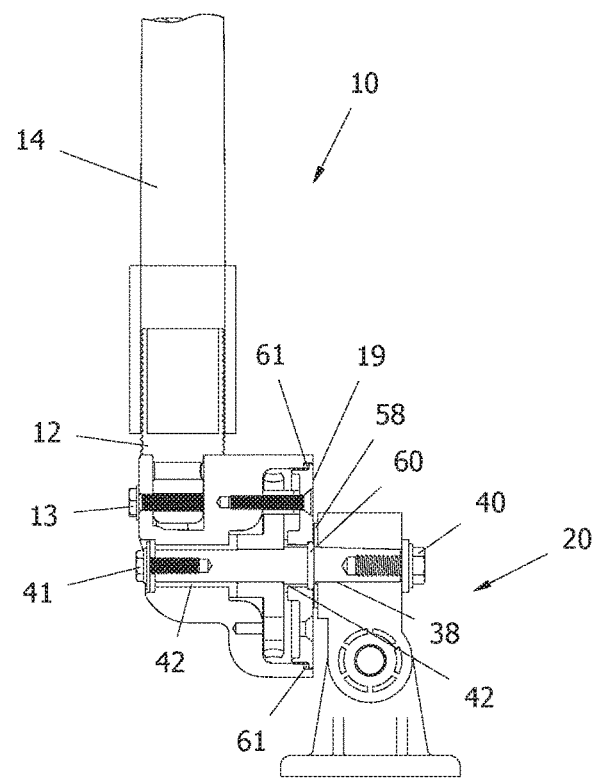

As shown in FIG. 4B, one end of the worm gear shaft 38 is fixed in the base 20 via a bolt or screw 40 threaded into the end of the worm gear shaft 38 through the base 20. The end of the worm gear shaft 38 fixed to the base 20 may be a tapered shaft which may provide a zero tolerance interference fit, and which may be drawn into the base 20 via the bolt or screw 40. The other end of the worm gear shaft, which extends through the gear housing 18, is surrounded by one or more UHMWPE bearings 42 which provide an interference radial fit between the shaft 38 and the housing 18. The one or more bearings 42 also provide a thrust surface against the worm gear and permits rotation of the gear housing about the portion of the worm gear shaft that extends through the gear housing 18. A bolt or screw 41 is threaded into this end of the worm gear shaft through the gear housing 18.

The motor housing 17 and the gear housing 18 may be water-tight housings. A thrust washer 58 and an O-ring seal 60 may be provided at the entrance of the worm gear shaft 38 into the gear housing 18 (see, e.g., FIGS. 2E and 4B). The O-ring seal 60 provides a water tight seal between the gear housing 18 and the worm gear shaft 38. A seal or gasket 61 may also be provided between the gear housing 18 and a rear cover plate 19 which together form a water-tight sealed housing. Screws may be provided for removably securing the rear cover plate 19 to the gear housing 18.

The worm gear 34 may comprise, for example, a 50 tooth gear with a 50:1 gear reduction ratio. Coupled with, for example, a gear motor 16 having a 100:1 gear reduction ratio, a 5,000:1 gear reduction ratio can be provided, with a motor speed of 5,000 rpm. In such a configuration, the actuator 10 can achieve one full extension or full retraction (90 degrees of movement) in 15 seconds. Such a high gear reduction ratio and high torque output allow smooth motion with tight fitting components that advantageously eliminate endplay. Of course, different worm gears and motors with different specifications can be provided to achieve different gear reductions, speed, and torque for different types of applications (e.g., for different types, sizes and weights of antennas).

Figure 5C:
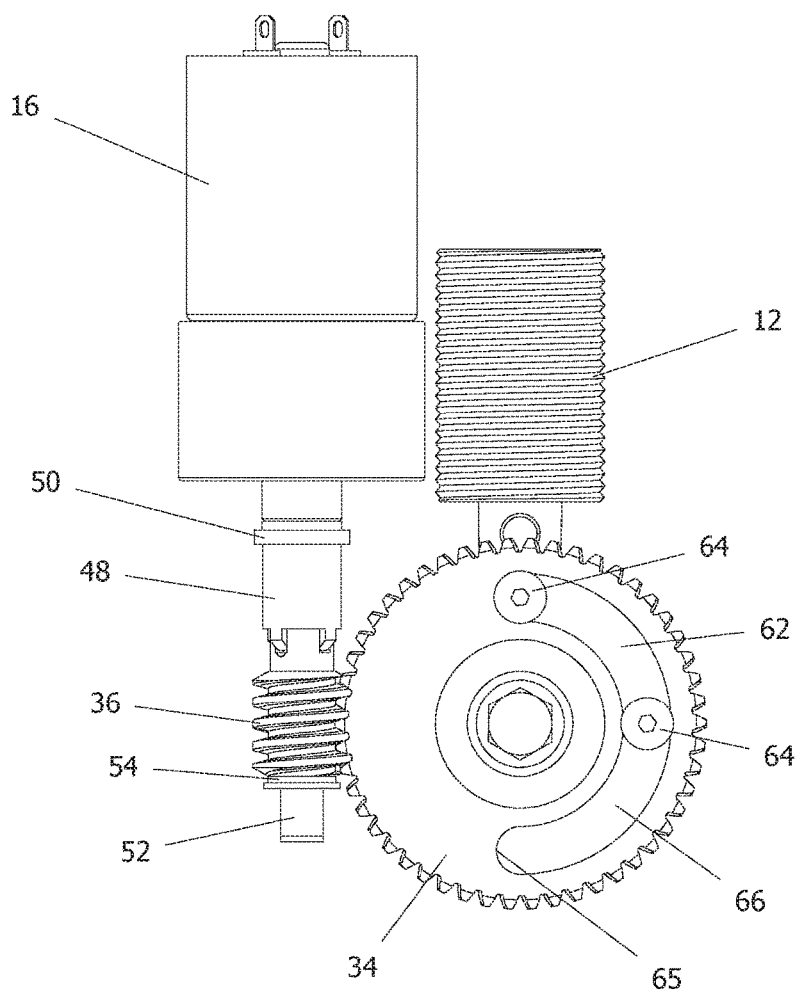
FIG. 5C shows the drive components of actuator embodiment of FIG. 5A without housings and covers.

As shown in FIGS. 5A-5C, a drive limiter may be provided that limits the maximum angular rotation of the gear housing 18 about the worm gear 34. The drive limiter may comprise a limiting element 62 fixed within the gear housing 18. For example, the limiting element 62 may be fixed in the gear housing 18 by two spaced apart pins 64 or may be constrained by a preformed pocket/cavity in the gear housing 18. The pins 64 may comprise rods, screws, or bolts, or comprise preformed extensions of the housing 18 or the connecting element. The worm gear 34 may be provided with a curved slot 66 that has a contour which conforms to the outer envelope of the worm gear 34. The curved slot 66 accepts the limiting element 62 when the gear housing 18 is mated to the base 20. In one example embodiment, the pins or screws 64 may extend through the rear cover plate 19, through the limiting element 62 (which is positioned in the slot 66) and into the gear housing 18. As the gear housing 18 rotates around the worm gear 34, the extent of rotation is constrained in each direction by the extent of travel of the limiting element 62 within the slot 66, which in the example shown is 90 degrees (from fully raised in a vertical position to fully lowered in a horizontal position or vice versa).

The limiting element 62 may be a curved element which rides within the slot 66 and has a shorter extent than that of the slot 66. It is noted that the limiting element 62 may be fixed and provide rotation throughout angle ranges greater or less than 90 degrees, or may be adjustable to permit different angle ranges, enabling larger or smaller ranges of motion, for example, to accommodate storage of an antenna 14 in a lowered position that is angled slightly downwards or upwards. For example, additional holes (e.g., screw hole 63 shown in FIG. 3A) may provide different locations for the pins 64 to provide for positional adjustment of the limiting element 62 in the gear housing 18, providing adjustability of the maximum angular displacement. In the example embodiment shown in FIG. 3A, moving the upper screw 64 into the bottom hole 63 so that the limiting device 62 is positioned between the lower screw 64 and the screw hole 63 will enable the actuator to move through different 90-degree angle range. Screw holes may also be provided in additional locations to provide the ability to adjust for less than or more than a 90-degree angle range.

The position of the pins/screws 64 and/or the size of the limiting element 62 may vary in order to provide for a desired angle range and/or orientation. For example, the location or size of the limiting element 62 may be set at the manufacturer in response to a customer order or changed by the customer upon opening of the gear housing 18. The maximum angle range may also be changed by changing the location and/or extent of the slot 66 on the worm gear 34 (or, e.g., by enabling interchangeability of different worm gears with different slot configurations).

One end of the limiting element 62 may act as a hard stop in the fully raised position and the other end of the limiting element 62 may act as a hard stop in the fully lowered position. When the end of travel is reached in either position (e.g., when the limiting element 62 contacts an end 65 of the slot 66), there is a load between the limiting element 62 and the worm gear 34. This load is opposed by the worm 36 to worm gear 34 contact. As the actuator 10 is driven to a hard or pre-loaded stop, there is no backlash in the assembly. The motor controller 30 senses a spike in the current at the end of travel (e.g., when the limiting element 62 contacts an end of the slot 65) and turns the motor off. The result is pre-loaded, zero-backlash running and resting positions.

FIG. 5A shows the actuator 10 rotated to a hard stop in a lowered position with the limiting element 62 abutting one end 65 of the slot 66. FIG. 5B shows the actuator 10 rotated to a hard stop in a raised position with limiting element 62 abutting the other end 65 of the slot 66.

While the Figures show the limiting element 62 as a monolithic curved element (see, e.g., FIG. 3A), those skilled in the art will appreciate that the limiting element may take a variety of shapes and forms, and may be made in more than one piece. For example, any structure that extends within the slot 66 and serves to rotate with the rotating assembly and which contacts the ends 65 of the slot at the desired stop positions may be employed. For example, a monolithic element of a different shape, or two separate limiting elements may be used, such as two separate pins extending from the inside of the gear housing 18 into slot 66.

Figure 8B:
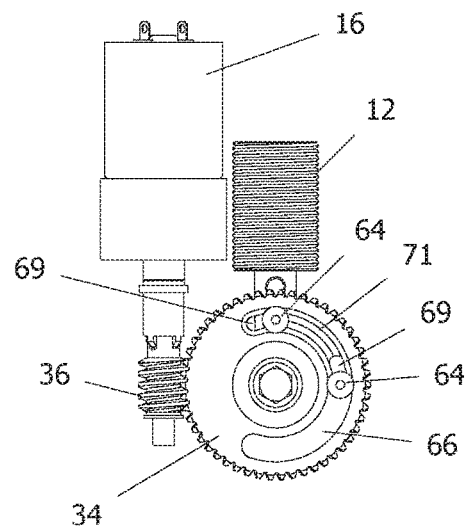
Figure 8D:
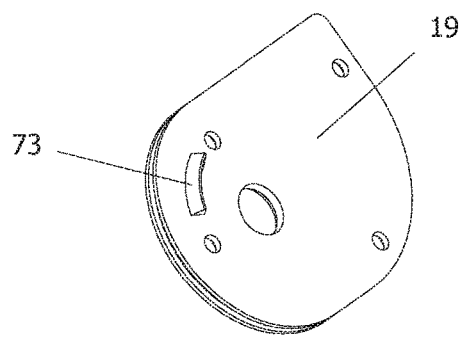
FIG. 8D shows an example embodiment of a rear cover for use with the mechanical drive limiter of FIGS. 8A-8C.
Figure 8C:
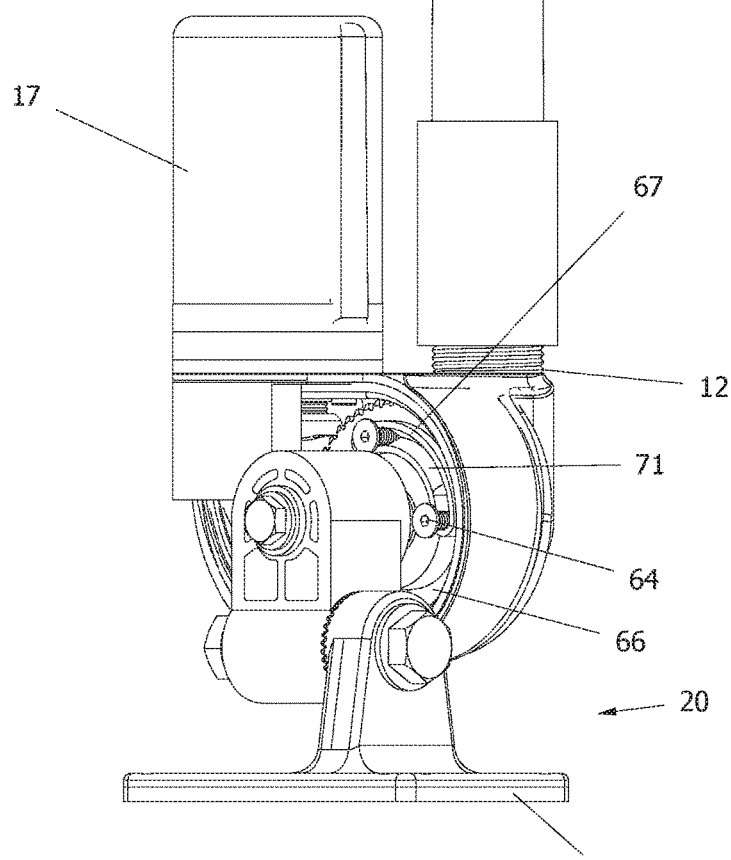

A further example embodiment of a drive limiter which provides greater adjustability than that discussed above is shown in FIGS. 8A-8D. In the example embodiment shown, a slotted limiting element 67 is provided. In the embodiment shown in FIGS. 8A-8C, the slot 66 in the worm gear 34 is lengthened as compared to that shown in FIG. 5A (as can be seen in FIG. 8B). The limiting element 67 is a curved element which rides within the slot 66 and has a shorter extent than that of the slot 66. The limiting element 67 has elongated slots 69 at either end and includes a V-grooved connecting portion 71 (as can be seen in FIG. 8C) extending between the slots 69. The screws or pins 64 extend through rear cover plate 19, through the slots 69 of the limiting element 67 positioned in the worm gear slot 66, and into the gear housing 18. A V-shaped projection 73 (see FIG. 8D) extends from an interior of the rear cover plate 19 and is adapted to mate with the V-grooved connecting portion 71 of the limiting element 67. Tightening of the screws 64 results in sandwiching of the limiting element 67 in position in the slot 66 with the V-shaped projection 73 engaging in the V-groove connecting portion 71. As the entire assembly, including rear cover plate 19, screws 64, limiting element 67, and gear housing 18 rotate together, the range of motion will be limited by ends of the limiting device 67 coming into contact with the ends of the slot 66. The elongated slots 69 provide adjustability of the angular range. For example, a desired stop position may easily be set by loosening screws 64 (which may be easily done from outside the rear cover plate 19) and driving the actuator to a desired position and tightening the screws 64 at that position. The extent of adjustability is determined by the length of the slots 69.

The limiting device may also comprise two separate limiting devices each having an elongated slot for one of the screws 64. This will enable independent adjustment of each of the stop positions. In such an example embodiment, the limiting devices may each engage with the interior of the gear housing 18 via V-shaped grooves and projections.

Although the example embodiments set forth above are described as having inter-engaging V-shaped depressions and projections, it should be appreciated that any other type of mutually inter-engaging shapes may be employed to the same effect.

It should be appreciated that a drive limiter which provides a hard stop may take a variety of forms besides the limiting elements 62 and 67 shown in the Figures. Any type of radial position limiter or stop mechanism may be used (including but not limited to various combinations of inter-acting components arranged on the worm gear 34 and interior of the gear housing 18, or the like).

In addition, it should be appreciated that the drive limiter may be any combination of solid metal, plastic, or elastomeric parts. The drive limiter may also contain a spring. For example, the limiter may comprise two pieces separated by a spring. The spring could be calibrated such that a known compression and a resultant force would trip the current limit in the controller 30. Such a configuration would be less abusive to the gears and the gear motor than a hard stop and may be advantageous in certain applications.

Figure 7A:
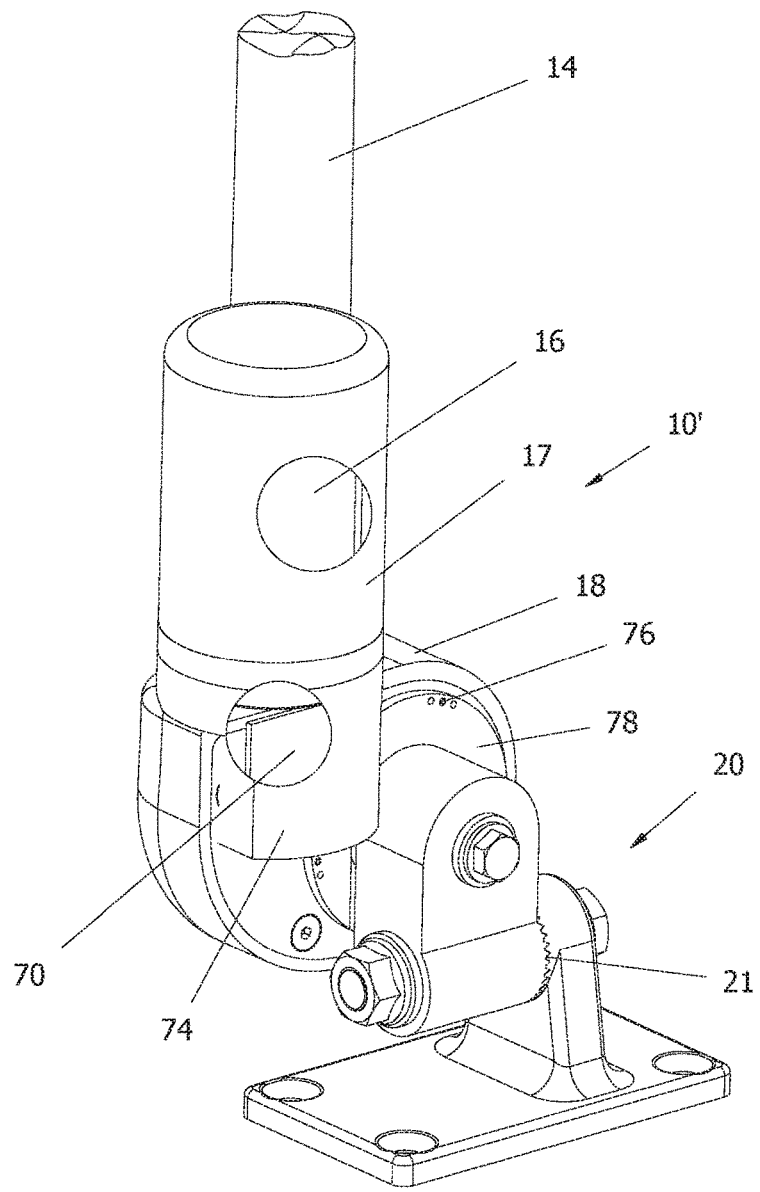
FIGS. 7A and 7B show cutaway views of a further example embodiment of an actuator with an electronic drive limiter in accordance with the present invention.
Figure 7B:
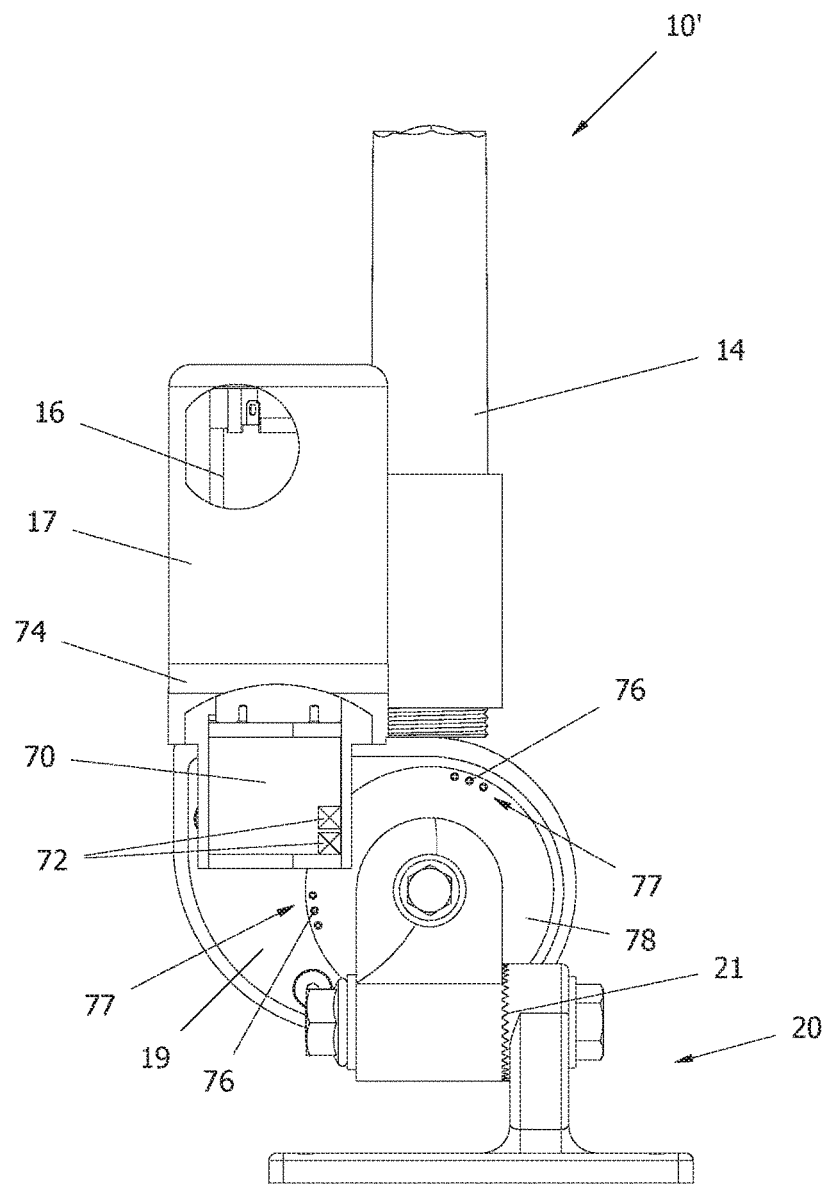

An alternate example embodiment of the actuator 10' is shown in FIGS. 7A and 7B. In this alternate example embodiment, the drive limiter may comprise a pre-programmed circuit board 70 with sensors 72 located in a sealed housing 74 connected with the motor housing 17. FIG. 7A shows the actuator 10' with partial cutaway views showing the motor 16 and the circuit board 70. The sealed housing 74 may extend from the motor housing 17 alongside the outside of the gear housing 18 (e.g., adjacent back cover 19 and the worm gear 34). The sensors 72 may be adapted to sense spaced apart magnetic position indicators such as magnetic flags 76 located on a magnet housing 78 fixed in relation to the worm gear 34 in a non-rotatable manner. The magnet housing 78 may be, for example, a circular ring or plate which snaps over the shaft 38. The magnet housing may have a pocket which conforms to a top portion of the base 20. Adjustability may be provided via multiple locations 77 on the magnet housing 78 for the magnetic flags 76, which may be easily removed from one location and inserted into another location to change the maximum angular displacement. Providing the magnetic flags 76 on a magnetic housing 78 that is accessible from the exterior of the actuator 10' enables easy adjustability of the angular range.

Note in alternate embodiments the circuit board 70 may be mounted within the gear housing 18 and the magnets 76 may be mounted in holes in the worm gear 34 itself, with a plurality of magnet holes provided in the worm gear 34 similar to that shown on the magnet housing 78. While such an embodiment provides better protection of the magnets and sensors from the weather, adjustability is more difficult as opening of the housing 18 is required.

The circuit board 70 may have the ability to switch control voltage off when the end of travel limits defined by the sensors 72 and magnetic flags 76 are sensed. The example embodiment shown in FIG. 7B shows two sensors 72 located adjacent one another. One sensor 72 may be dedicated to sensing one of the magnets 76 at one stop position and the other sensor 72 may be dedicated to sense the other of the magnets 76 at the other stop position. Further, the magnet 76 corresponding to one stop position may be arranged on one radii of the worm gear 34 or magnet housing 78 and the magnet 76 corresponding to the other stop position may be arranged on a different radii of the worm gear 34 or magnet housing 78, with the sensors 72 arranged in corresponding positions on the board 70. This arrangement permits determination of the position of the actuator and, together with an optional movement or actuation timeout, ensures that the limit of travel (i.e., the stop) is not exceeded and prevents a magnet from passing through one sensor undetected and reaching the next sensor.

Based on a position determination at one end of travel limit and the duration of actuation of the actuator, absolute position at any point between the end of travel limits can also be determined by the circuit board 70 or a controller 30 connected to the circuit board 70.

Other configurations may be used, including an embodiment where only one sensor 72 is used to sense both end of travel positions/magnets 76. Similarly, an array of magnets 76 spaced apart on the worm gear 34 or the magnet housing 78 along the arc of travel may be used to determine absolute position of the actuator 10'.

In one example embodiment, the features of the motor controller 30 and the circuit board 70 may be combined.

The configuration shown in FIGS. 7A and 7B would allow one wireless controller and/or dash mounted switch to run two or more actuators 10' simultaneously with a single command to the same or different predetermined positions. The actuators 10' need not travel through the same range of angular displacement or for the same length of time since each actuator has the ability to stop independently at preset limits and prevent over-travel.

The sensors 72 may comprise two hall effect sensors, each unique to opposing positions in order to prevent a restart that results in exceeding directional limits. For example, in an embodiment using two sensors 72, the position of the actuator 10' can be determined based on which sensor 72 is sensing a magnet 76 and which sensor 72 is not. Thus, the controller can prevent the actuator 10' from restarting in the wrong direction based on such a position determination. If neither sensor 72 detects a magnet 76, it can be determined that it is safe to move the actuator in either direction.

In the case of a wireless controller, the signal may be sent for a length of time sufficient to move both or all antennas thru the maximum angular displacement to ensure the limits of each is achieved. The magnets 76 may be inserted into any of an array of holes 77 in the worm gear 34 or the magnet housing 78 to achieve the desired stop positions. Alternatively, the position of the magnet housing 78 may be adjustable by rotating it in relation to the base 20. A passage may run from the sealed housing 74 into the motor housing 17 to permit connection of the circuit board 70 and motor 16 via, e.g., a wire or ribbon cable. This configuration may also utilize a spring in place of a hard stop type drive limiter to achieve zero-backlash.

It should also be appreciated that the use of a drive limiter may not be required in embodiments employing a torque limiting device on the output shaft 44. However, the use of a drive limiter with hard stops such as that shown in FIGS. 5A-5C and 8A-8D has the advantage of simplicity and robustness. FIG. 8A shows an embodiment with both a torque limiting device 80 and a drive limiter. FIG. 8B shows an embodiment with only a drive limiter. Further, the use of an electronic drive limiter comprising sensors with externally accessible magnets as shown in FIGS. 7A and 7B provides the advantage of ease of adjustability without the need to open the gear housing 18 as well as imparting minimal stress to the motor and gear train. However, it should also be appreciated that the actuator can be implemented with both a drive limiter and a torque limiting device on the output shaft.

The base 20, the gear housing 18, device coupler 12, and the motor cover 17 may each be made from metal, aluminum, plastic, elastomer, fiberglass, composite materials, or the like. For example, the base 20, gear housing 18, and device coupler 12 may be made from cast stainless steel. The motor cover 17 may be made from injection molded plastic. Other combinations of materials are possible.

Although the present invention has been described herein in connection with an actuator for raising and lowering of a marine antenna, those skilled in the art will appreciate that the present invention can be used for any type of antenna whether mounted on a moving vehicle or a stationary object (including but not limited to satellite, GPS, television, and cellular antennas, and antennas for building, vehicle, vessel, aircraft, and the like), as well as for any other device that requires raising or lowering (or other position change), including but not limited to vision systems, lighting, navigation lighting, cameras, flags, bimini tops (e.g., employing two actuators), and the like.

It should now be appreciated that the present invention provides an advantageous actuator for raising and lowering antennas in marine environment.

Although the invention has been described in connection with various illustrated embodiments, numerous modifications and adaptations may be made thereto without departing from the spirit and scope of the invention as set forth in the claims.

What is claimed is:

1. An actuator for a marine antenna, comprising:
 a base with a mount adapted to be fixed to a surface of a vessel;
 a fixed worm gear arranged on the base;
 a worm arranged in a gear housing and engaged with the fixed worm gear;
 a motor comprising an output shaft connected to the worm, the motor being arranged in a motor housing mounted to the gear housing;
 an antenna coupler connected to the gear housing; and
 a drive limiter for limiting a maximum angular displacement of the gear housing about the worm gear, the drive limiter comprising magnetic position indicators arranged on one of the worm gear or a magnet housing fixed in relation to the worm gear and one or more corresponding sensors arranged on an electronic circuit board;
 wherein the gear housing is adapted to mate with the base for rotation about the fixed worm gear upon rotation of the worm.

2. An actuator in accordance with claim 1, wherein:
 the fixed worm gear is arranged on a worm gear shaft with a press fit; and
 the worm gear shaft has no rotational component.

3. An actuator in accordance with claim 2, wherein:
 a portion of the worm gear shaft extends through the gear housing; and
 the gear housing rotates on the portion of the worm gear shaft which extends through the gear housing.

4. An actuator in accordance with claim 3, wherein one or more ultra-high molecular weight polyurethane (UHMWPE) bearings are provided on the portion of the worm gear shaft which extends through the gear housing.

5. An actuator in accordance with claim 3, further comprising:
 a water-tight seal is provided between the gear housing and the worm gear shaft at a point of entrance of the worm gear shaft into the gear housing; and wherein the motor housing and the gear housing each comprise water-tight housings.

6. An actuator in accordance with claim 1, wherein the worm is radially fitted to the output shaft and axially constrained by walls of the gear housing, preventing axial loads from being transferred to the motor.

7. An actuator in accordance with claim 1, wherein the drive limiter is adjustable to permit changing of the maximum angular displacement.

8. An actuator in accordance with claim 1, further comprising a torque limiting device arranged between the output shaft and the worm.

9. An actuator in accordance with claim 1, wherein:
the motor is operable in at least one of a latched mode or a momentary mode;
the gear housing is rotatable between two stop positions;
in the latched mode, the motor once initiated will run until the gear housing reaches one of the two stop positions; and
in the momentary mode, the gear housing is rotatable to either of the two stop positions and any position between the two stop positions.

10. An actuator in accordance with claim 1, wherein the motor is controlled remotely via at least one of a remotely wired switch and a wireless remote control device in communication with a motor controller.

11. An actuator in accordance with claim 1, wherein the motor, the output shaft, and the worm form a drive arrangement with an axis that extends parallel to an axis of the antenna coupler.

12. An actuator in accordance with claim 1, wherein:
the magnetic position indicators comprise two spaced apart magnetic position indicators arranged on the worm gear or the magnet housing; and
a position of each of the two magnetic position indicators is adjustable.

13. An actuator in accordance with claim 1, wherein:
the magnetic position indicators comprise a plurality of magnetic position indicators arranged on the worm gear or the magnet housing; and
the electronic circuit board is programmable to turn off current to the motor upon sensing any one of the plurality of magnetic position indicators.

14. Currently amended) An actuator in accordance with claim 1, wherein the motor is controlled remotely via at least one of a remotely wired switch and a wireless remote control device in communication with one of the electronic circuit board or a motor controller in communication with the electronic circuit board.

15. An actuator in accordance with claim 14, wherein:
at least one of the remotely wired switch or the wireless remote control device are adapted to control two or more actuators simultaneously with a single command; and
the two or more actuators are set to operate within angular ranges which are independent of one another.

16. An actuator in accordance with claim 1, wherein the antenna coupler is removably connected to the gear housing.

17. An actuator for a marine antenna, comprising:
a base with a mount adapted to be fixed to a surface of a vessel;
a fixed worm gear arranged on the base;
a worm arranged in a gear housing and engaged with the fixed worm gear;
a motor comprising an output shaft connected to the worm, the motor being arranged in a motor housing mounted to the gear housing;
an antenna coupler connected to the gear housing; and
a drive limiter for limiting a maximum angular displacement of the gear housing about the worm gear, the drive limiter comprising one or more limiting elements fixed within the gear housing;
wherein:
the one or more limiting elements extend within a curved slot of the worm gear, a contour of the curved slot corresponding to an outer envelope of the worm gear;
an extent of the rotation of the gear housing about the worm gear is limited in each direction of movement by the one or more limiting elements contacting a corresponding end of the curved slot; and
the gear housing is adapted to mate with the base for rotation about the fixed worm gear upon rotation of the worm.

18. An actuator in accordance with claim 17, wherein a position of the one or more limiting elements in the gear housing is adjustable.

19. An actuator in accordance with claim 17, further comprising a motor controller for sensing a current spike when the one or more limiting elements contacts the corresponding end of the curved slot and for turning off the motor when the current spike is sensed.

* * * * *